(12) United States Patent
Dunlap et al.

(10) Patent No.: US 10,000,129 B2
(45) Date of Patent: Jun. 19, 2018

(54) ELECTRIC VEHICLE CHARGING VIA GRID AND ENGINE

(71) Applicant: Ford Global Technologies, LLC, Dearborn, MI (US)

(72) Inventors: Brock Dunlap, Plymouth, MI (US); Karin Lovett, Novi, MI (US); Bryan Michael Bolger, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 14/800,095

(22) Filed: Jul. 15, 2015

(65) Prior Publication Data

US 2017/0015208 A1    Jan. 19, 2017

(51) Int. Cl.
*H02J 7/00* (2006.01)
*B60L 11/18* (2006.01)

(52) U.S. Cl.
CPC ....... *B60L 11/1816* (2013.01); *Y02T 10/7005* (2013.01); *Y02T 10/7088* (2013.01); *Y02T 10/92* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| 7,665,557 | B2  |   | 2/2010  | Hughes et al. |          |
|-----------|-----|---|---------|---------------|----------|
| 7,740,092 | B2  |   | 6/2010  | Bender        |          |
| 8,403,086 | B1  |   | 3/2013  | Free et al.   |          |
| 2002/0189222 | A1 | * | 12/2002 | Reimers ................. | A01D 69/02 |
|           |     |   |         |               | 56/14.7  |
| 2008/0111519 | A1 | * | 5/2008  | Vasilantone ............. | B60K 6/48 |
|           |     |   |         |               | 320/109  |
| 2009/0140698 | A1 | * | 6/2009  | Eberhard ................ | H02J 7/045 |
|           |     |   |         |               | 320/152  |
| 2010/0141203 | A1 | * | 6/2010  | Graziano ............ | B60L 11/1816 |
|           |     |   |         |               | 320/109  |
| 2011/0030639 | A1 | * | 2/2011  | Kwiecinski ......... | F02N 11/0807 |
|           |     |   |         |               | 123/179.2 |
| 2012/0158228 | A1 | * | 6/2012  | Biondo ................... | B60L 1/003 |
|           |     |   |         |               | 701/22   |
| 2012/0290149 | A1 | * | 11/2012 | Kristinsson ........... | B60W 10/06 |
|           |     |   |         |               | 701/2    |
| 2014/0009113 | A1 | * | 1/2014  | Robins ............... | B60L 11/1809 |
|           |     |   |         |               | 320/109  |

* cited by examiner

*Primary Examiner* — Arun Williams
(74) *Attorney, Agent, or Firm* — David B. Kelley; Brooks Kushman P.C.

(57) ABSTRACT

A vehicle includes an engine, a traction battery, a generator coupled to the engine and battery, and a controller. The controller may be configured to, in response to a current flowing from a battery charge station to the battery being less than a maximum charge current, a selection of a fast charge mode, and a temperature of the engine being less than a predetermined temperature, operate the engine to generate a supplemental current to charge the battery.

17 Claims, 4 Drawing Sheets

ELECTRIC VEHICLE CHARGING VIA GRID AND ENGINE

TECHNICAL FIELD

This application is generally related to charging a traction battery of a hybrid-electric vehicle via an engine and a power grid.

BACKGROUND

Hybrid-electric vehicles include an internal combustion engine (ICE), at least one electric machine that may be configured as an electric motor or as an electric generator, and a traction battery. The traction battery provides power to the electric machine for propulsion and some accessory loads. Vehicles that utilize a high-voltage traction battery may be referred to as electrified vehicles. The traction battery has a state of charge (SOC) that indicates how much electric charge is held in the battery. To increase the SOC, a hybrid-electric vehicle may employ multiple methods including charging the traction battery using the momentum of the vehicle to turn a generator, operating the ICE to turn the electric machine configured as a generator, and electrically coupling the traction battery to an external charge station, also referred to as "plugging in" the car. When a hybrid vehicle is plugged in, the time to charge the traction battery is limited by the amount of energy with respect to time, typically measured in terms of watts, which can flow from the charge station to the vehicle.

SUMMARY

A vehicle includes an engine, a traction battery, and a controller. The controller is configured to, in response to a battery charge current from a battery charge station being less than a maximum charge current while the vehicle is parked and in a fast charge mode, operate the engine to generate a supplemental current to increase a charge rate of the battery.

A powertrain control module for a hybrid vehicle includes a controller configured to, in response to a selection of a fast charge mode and a flow of electric charge from a battery charge station to a traction battery, operate an engine to drive a generator to generate a supplemental current to increase a rate of charge of the battery.

A method to supplement current from a battery charge station includes operating an engine to drive a generator electrically coupled with a traction battery to generate a supplemental current to increase a charge rate of the battery while a traction battery is receiving current from the charge station.

DETAILED DESCRIPTION

Figure 1:
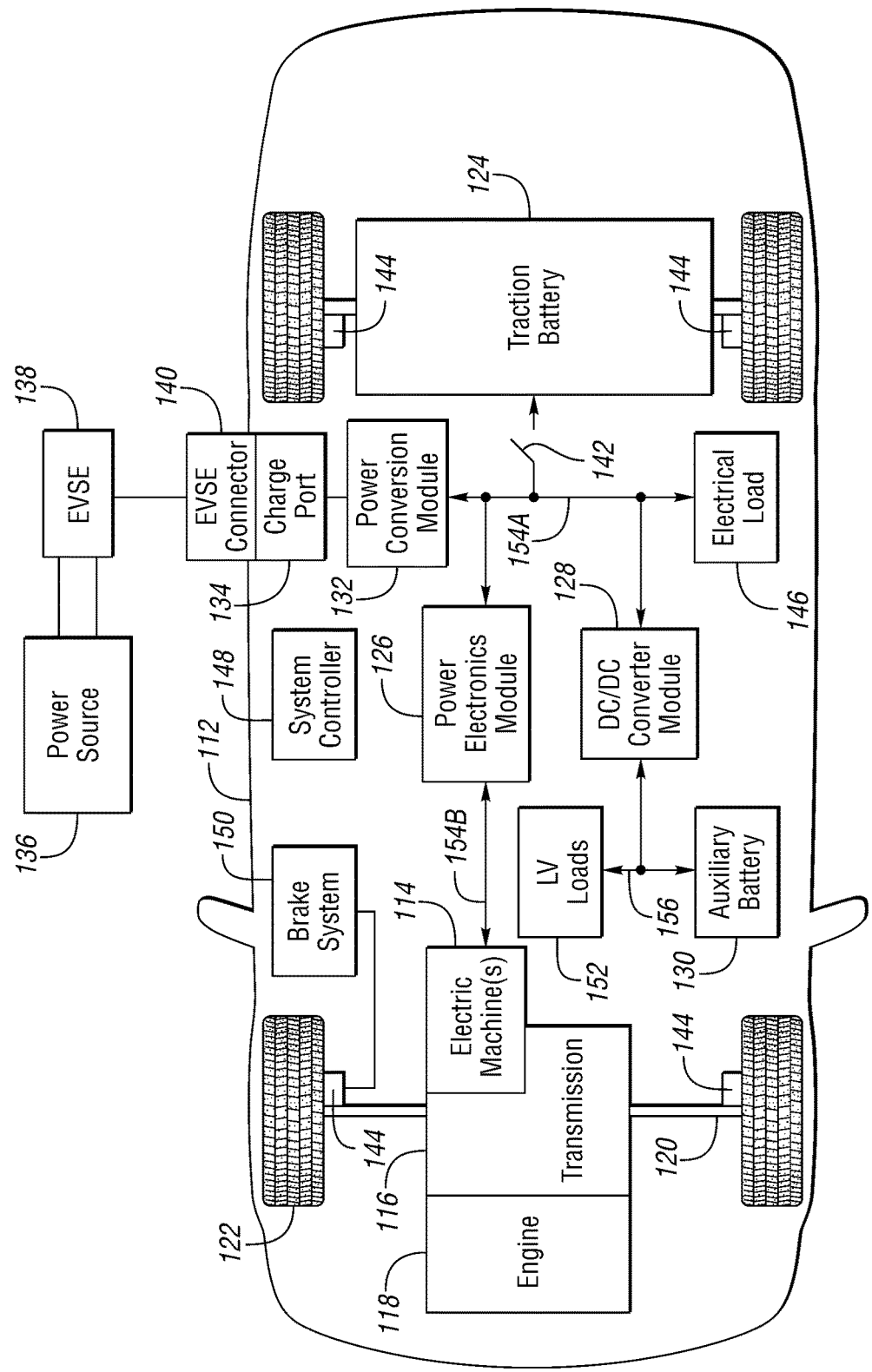
FIG. 1 is a diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As a hybrid vehicle is operated, the SOC of the traction battery changes. Often it is desirable to maximize the utilization of the energy stored in the battery by converting the electric energy to propulsive power for the vehicle. When the vehicle is at rest, the plug-in vehicle can be coupled to a utility power grid to charge the battery. The rate which a plug-in hybrid vehicle charges from an electric charge station is limited by station factors including the rating of the outlet the charge station is coupled to. Examples of limitations include a 110V AC outlet with a 20 amp circuit breaker providing a maximum 2.2 kilowatts of charging power, or a 240V AC outlet with a 50 amp circuit breaker providing a maximum of 12 kilowatts of charging power. The maximum would be reduced due to losses in converting the AC current to DC for the battery. However, an ICE turning a generator may provide 35 kilowatts, but when the vehicle is in park the engine may be operated in the order of 5-10 kW for the purpose of efficiency and noise.

A battery charging from the ICE would charge more than 15 times faster than the vehicle charging with a 110V/20 amp AC outlet. Typically, once plugged-in, a vehicle operator desires to maximize utilization of the electric energy from the utility company. However, in the event that the user desires the battery be charged quicker, the user may select a vehicle fast charge mode such that the ICE of the vehicle operates to generate a current to supplement the current from the charge station. An example of when this may be desirable is if the operator of the vehicle is planning on driving through a "green zone" that requires the vehicle to be propelled by electricity only or if the vehicle is an emergency vehicle that may require the extra energy during operation.

Despite the amount of power that is supplied to the vehicle, the amount of power that can actually be used is dependent upon many factors including a capacity of the onboard charger. The onboard charger transforms the supplied power into the proper form to charge the battery (e.g., convert AC to DC). These on-board chargers typically have power ranges from 3-7 kW. For example an early model compact hybrid vehicle had a 3.3 kW on-board charger whereas a midsize hybrid vehicle had a 6.6 kW on-board charger. A level 1, 120 VAC charger can provide 16 amps or 1.92 kW, and a level 2, 240 VAC charger can provide up to 80 amps or 19.2 kW.

Level 1 charging is provided through a 120 VAC plug. Many vehicles come equipped with a charge cord that has a standard house hold plug (NEMA 5-15 connector) on one end and the SAE J1772 standard electrical connector for electric vehicles. These types of charge cords are typically portable and allow drivers to charge wherever a plug is available. Depending on vehicle and battery type, level 1 charging can add 2-5 miles of electric range for every hour of charging.

Level 2 charging is provided through 240 V AC power. These types of charging units are typically permanently installed. A level 2 charging station consists of a control box that waits for the cord to be plugged into a vehicle prior to supplying power to the cord. Level 2 chargers use the SAE J1772 standard electrical connector which is common with level 1 chargers. Depending on the vehicle, battery type, and onboard charger capacity, a level 2 charger can replenish 10-25 miles of electric range per hour of charging.

Along with plug-in charging, this technology is applicable to inductive charging. Inductive charging is an emerging technology that currently can operate at power levels comparable to level 2 charging.

Also, this technology is applicable to DC fast charging. DC fast charging is converting the AC grid voltage to DC and the passage of DC voltage directly to the battery. The transfer of DC voltage directly to the battery may achieve a power transfer rate greater than current level 1 or level 2 AC charge stations. Some vehicles are equipped with DC fast charge capability. Depending on the vehicle and battery type, these charging stations can add 20-40 miles of range in about 10 minutes of charging.

A fast charge mode is disclosed that is a user selectable function using a gas engine to generate power by turning a generator and grid power to charge the high voltage battery of PHEVs or a HEV configured to accept power via inductive coupling. The fast charge mode may have multiple levels of charging (e.g., high, med, low) which can also be specified by a user. The user may select the fast charge mode via a graphical user interface (GUI) on an infotainment system, instrument cluster, keypad, console, application running on a computing device coupled with the vehicle or other interface. The GUI may be structured with parameters that set characteristics of the fast charge (such as power transfer rate, time of operation, schedule of operation, etc.). These parameters may be configured through on board instrument panel, vehicle control buttons, or over a wireless communication network.

Fast charge mode may be user enabled or alternatively may use location data such as a previously saved charge locations to be enabled. A user can determine where and when the fast charge mode can operate. For example, a vehicle with fast charge mode can determine if the vehicle is outdoors using a GPS signal, information about the location of the charge station, or if the user specifies that the charge station is outdoors, to allow entry into fast charge mode. Alternatively, a vehicle with fast charge mode can determine if the vehicle is in a confined space using a GPS signal, information about the location of the charge station, or if the user specifies that the charge station is confined or indoors (such as a garage, parking structure, etc.) to inhibit entry into fast charge mode. Alternatively, the vehicle may be equipped with a sensor configured to provide a level of carbon monoxide of an area around the vehicle. The area around the vehicle may include an area proximate to the vehicle such as within a 2 foot perimeter of the vehicle. If the level of carbon monoxide is greater than a threshold amount, such as a STEL (short-term exposure limit) or other level, some of which are provided by OSHA (Occupational Safety and Health Administration), the vehicle may inhibit operation of the engine or entry into fast charge mode. The level of carbon monoxide is a concentration measured in parts per million (PPM)

FIG. 1 depicts a typical plug-in hybrid-electric vehicle (PHEV). A PHEV 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to an electric machine 114 and the engine 118 may not be present. The DC high-voltage bus 154A and the AC high-voltage bus 154B may be referred to individually or collectively as the high-voltage bus 154.

In addition to providing energy for propulsion, the traction battery 124 may provide energy for other vehicle electrical systems. A vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high voltage DC output of the traction battery 124 to a low voltage DC supply that is compatible with low-voltage vehicle loads 152. The low-voltage bus 156 may be electrically coupled to an auxiliary battery 130 (e.g., 12V battery). The low-voltage systems 152 may be electrically coupled to the low-voltage bus 156. The low-voltage system 152 may include various controllers within the vehicle 112. If the voltage of the auxiliary battery 130 falls below a minimum threshold voltage, the low-voltage systems 152 may not be able to power up and operate. The result of the low-voltage systems 152 being inoperative may be a loss of ability to start the vehicle. For example, if a controller that manages the traction battery 124 cannot be powered up, the contactors 142 may remain open.

The vehicle 112 may be an electric vehicle or a plug-in hybrid vehicle in which the traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands via a brake pedal and may also operate autonomously to implement features such as stability control. The controller of the brake system 150 may implement a method of applying a requested brake force when requested by another controller or sub-function.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include compressors and electric heaters.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components.

During an ignition-off condition, the contactors 142 may be in an open state so that the traction battery 124 does not provide power to the high-voltage bus 154. During the ignition-off condition, the traction battery 124 may be decoupled from the auxiliary battery 130. During the ignition-off condition, selected electronic modules (e.g., low-voltage loads 152) may be active. For example, a theft-deterrent system and a remote keyless entry system may continue to be active. The active systems may draw current from the auxiliary battery 130. In some configurations, low-voltage loads 152, such as lamps, may be accidently left in an active condition and draw current from the auxiliary battery 130, which may increase a rate of discharge of the auxiliary battery 130. During the ignition-off condition, the low-voltage loads 152 may be configured to minimize current draw.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

Figure 2:
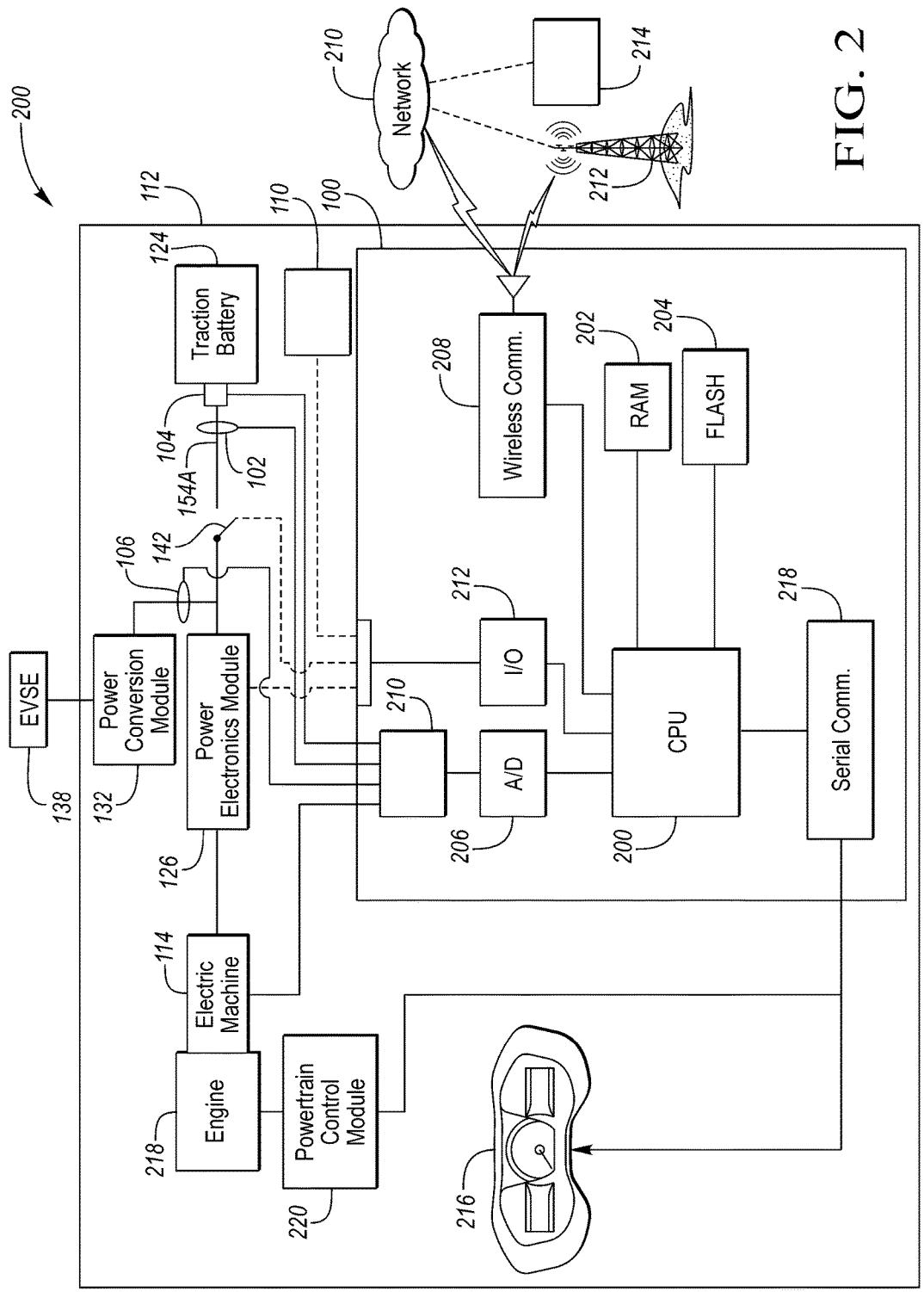
FIG. 2 is a diagram of a control system for a high-voltage bus in a plug-in hybrid vehicle.

FIG. 2 is a diagram of a control system for a high-voltage bus in a plug-in hybrid vehicle. The controller 100, although represented as a single controller, may be implemented as one or more controllers. The controller 100 may monitor operating conditions of the traction battery 124, the power conversion module 132 and the electric machine 114. A traction battery current sensor 102 may be coupled to the traction battery 124 to sense a current that flows from/to the traction battery 124. A traction battery voltage sensor 104 maybe coupled to the traction battery 124 to sense a voltage across terminals of the traction battery 124. The traction battery voltage sensor 104 may output a signal indicative of the voltage across the terminals of the traction battery 124. The traction battery current sensor 102 may output a signal of a magnitude and direction of current flowing through the traction battery 124.

A power conversion module current sensor 106 may be coupled to the power conversion module 132 to sense a current that flows from the EVSE 138 to the traction battery 124. The engine 218 coupled to the electric machine 114 generates an AC current that is converted to a DC current by the power electronics module 126. The ICE or engine 218 is controlled by a powertrain control module 220 that includes at least one controller and is coupled to the controller 100. The power conversion module current sensor 106 may output a signal of a magnitude and direction of current flowing from the EVSE 138 to the traction battery 124.

The outputs of traction battery current sensor 102 and the traction battery voltage sensor 104 may be input to the controller 100. The controller 100 may include interface circuitry 210 to filter and scale the current sensor signals and the voltage sensor signals.

The controller 100 may be configured to compute a state of charge of the traction battery 124 based on the signals from the traction battery current sensor 102 and the traction battery voltage sensor 104. Various techniques may be utilized to compute the state of charge. For example, an ampere-hour integration may be implemented in which the current through the traction battery 124 is integrated over time. The state of charge may also be estimated based on the output of the traction battery voltage sensor 104. The specific technique utilized may depend upon the chemical composition and characteristics of the particular battery.

A state of charge operating range may be defined for the traction battery 124. The operating ranges may define an upper and lower limit at which the state of charge may be bounded for the battery 124. During vehicle operation, the controller 100 may be configured to maintain the state of charge of the battery 124 within the associated operating range.

The controller 100 may be configured to monitor the status the traction battery 124. The controller 100 may include a processor 200 that controls at least some portion of the operation of the controller 100. The processor 200 allows onboard processing of commands and routines. The processor 200 may be coupled to non-persistent storage 202 and persistent storage 204. In this illustrative configuration, the non-persistent storage 202 is random access memory (RAM) and the persistent storage 204 is flash memory. In general, persistent (non-transitory) storage 204 can include all forms of storage that maintain data when a computer or other device is powered down.

The processor 200 may be coupled to an Analog-to-Digital converter 206 that is configured to convert analog signals to digital form. For example, the outputs from the interface circuitry 210 for the current and voltage sensor signals may be coupled to the A/D converter 206 for input to the processor 200.

The controller 100 may include a wireless communications module 208 to communicate with nomadic devices 214 (e.g., smart phone, smart watch, electronic tablet, computer) remote from the vehicle 112. The wireless communications module 208 may include an onboard modem having an antenna to communicate with off-board devices 214. The wireless communications module 208 may be a cellular communications device to enable communications via a cellular data network 212. The wireless communications module 208 may be a wireless local area network (LAN) device compatible with the IEEE 802.11 family of standards (i.e., Wi-Fi) or a WiMAX network. The wireless communications module 208 may include a vehicle based wireless router to allow connection to remote networks 210 in range of a local router. The wireless communications module 208 may be configured to establish communication with a nomadic device 214 (e.g., phone, tablet, computer). The nomadic device 214 may be connected to an external network 210. The controller 100 may be programmed to implement an appropriate communications protocol in hardware and software that is compatible with a selected mode of wireless communication. Although depicted as part of the controller 100, the wireless communications module 208 may be part of a different controller within the vehicle 112 and the controller 100 may interface with the different controller via the serial communications bus.

The fast charge mode indicator and an engine operating indicator may be communicated via the wireless communications module 208 to the nomadic device 214. The nomadic device 214 may include a processor and associated volatile and non-volatile memory that is configured to store and execute programs or applications. For example, the nomadic device 214 may execute an application such as MyFord Mobile that is configured to transfer vehicle related status and commands between the nomadic device 214 and the vehicle 112. In some configurations, the nomadic device 214 may include a web browser application. Communication with the vehicle 112 may be established via a web-based interface. The nomadic device 214 may receive a communication that includes the fast charge mode indicator, an engine operating indicator, and a traction battery SOC indicator. The nomadic device 214 may display the indicators to the operator on a display screen associated with the nomadic device 214. Upon receiving the indicators, the operator may decide upon a course of action.

The nomadic device 214 may include an application that controls various ways of configuring, activating and notifying the fast charge mode indicator, an engine operating indicator, and a traction battery SOC indicator. The application may run as a background task and periodically monitor for a received message. When a message is received that includes the indicator, a notification may be generated. The notification may interrupt a currently running application. Further, if the nomadic device 214 is in a sleep state, the application may wake up the nomadic device 214 to indicate the high-voltage indicator. The application may indicate the indicator with a visual indication (e.g., illumination of a light emitting device, blinking of the light emitting device, illumination of the instrument cluster 216, powering on the instrument cluster 216, displaying an on-screen message, or flashing a light), an audible indication (e.g., sound through a speaker or chime), and/or a tactile indication (e.g., vibration of the nomadic device 214).

In some configurations, the application executed by the nomadic device 214 may provide an option for the operator to set the parameter associated with the fast charge mode remotely. In response to receiving a battery SOC indicator and a start time for a trip being less than a time to charge the battery, the operator may set the fast charge mode parameter via the application executed by the nomadic device 214.

Figure 3:
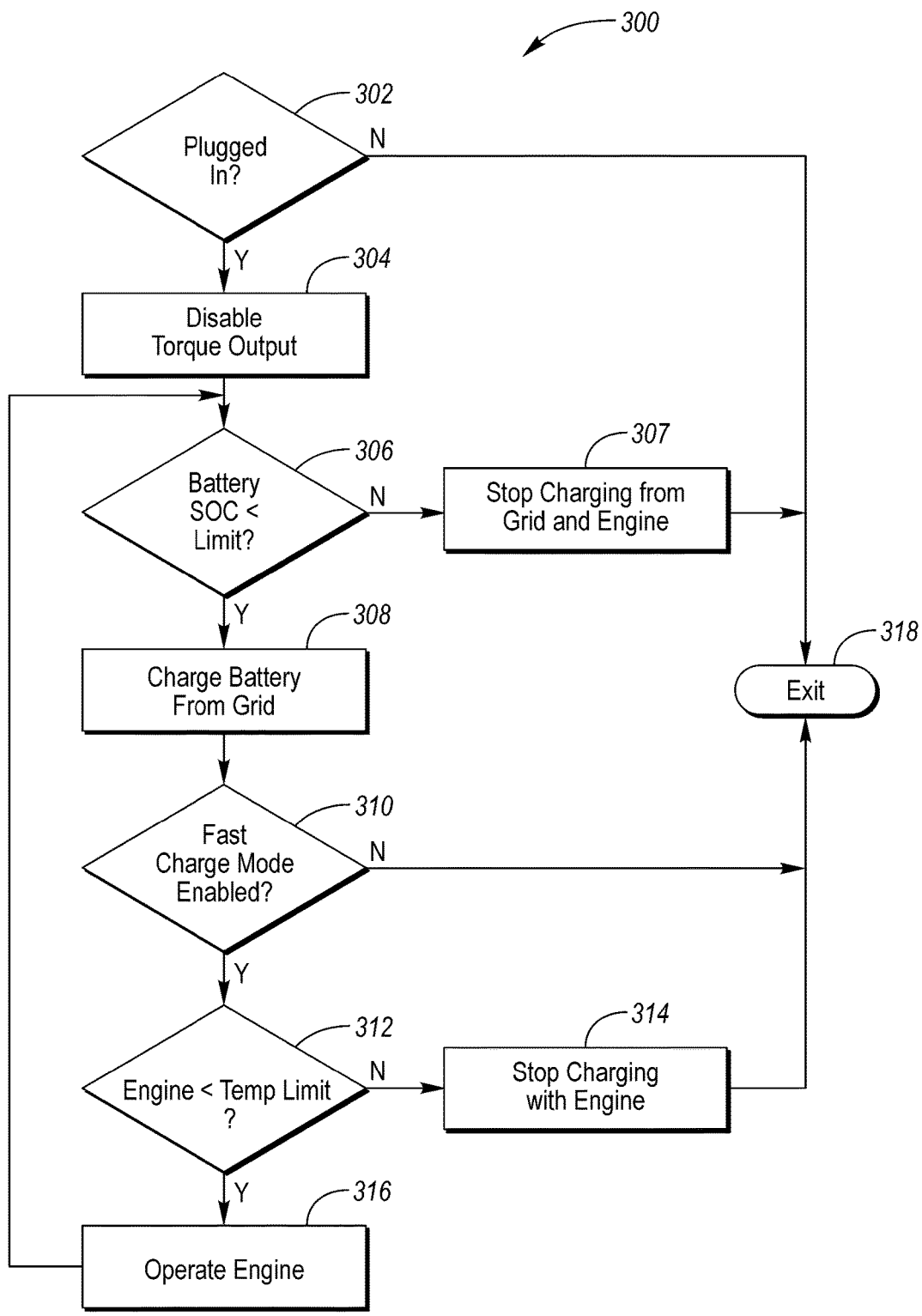
FIG. 3 is a flow diagram of a fast charge mode for a plug-in hybrid vehicle.

FIG. 3 is an exemplary flow diagram of a fast charge mode 300 for a plug-in hybrid vehicle illustrating an embodiment. This control system may be implemented in one or more controllers. In block 302, the controller checks if the vehicle is plugged in. This step may include checking the operating status of the vehicle. The operating status of the vehicle may include the vehicle is in a park mode, a key is in an ignition of the vehicle, and the charge station 138 is coupled to the traction battery 124. Based on the status of the vehicle, such as the vehicle being parked, plugged in, or inductively coupled to an inductive charge station and in a charge mode, the controller disables torque output in block 304. Torque is disabled as the vehicle will be electrically coupled to the charge station 138. In block 306 the battery SOC is determined. If the battery SOC is below a SOC limit then the controller will flow a current from the charge station 138 to the traction battery 124 in block 308. If the battery SOC is above a SOC limit, the controller will stop charging the battery from the power grid and the engine in block 307. The controller may also monitor the current flowing from the charge station 138 to the battery via the current sensor 106. The controller will check the status of calibration parameters in block 310. The calibration parameters include a fast charge mode. If the fast charge mode parameter is not enabled, the controller will continue to monitor the battery SOC while a current flows from the charge station 138. If the fast charge mode parameter is enabled, the controller will then check an engine temperature in block 312. The check an engine temperature in block 312 may include monitoring an ambient temperature of the engine compartment. If the engine temperature is below a threshold temperature, the controller may operate the ICE to turn a generator and flow a supplemental current from the generator to the battery. The supplemental current from the generator is combined with the current from the charge station to provide a total charge current. If the temperature is above the temperature limit, the controller will stop charging the battery using the engine in block 314.

Block 316 is performed in response to the fast charge mode being enabled and the battery SOC being below a threshold. The engine 218 will operate to turn a generator 114 and provide a supplemental current to the battery while the vehicle 112 is plugged into a charge station 138. If any of the conditions (a) the battery SOC test in block 306, (b) the fast charge mode enabled test in block 310, or (c) the engine temperature limit test in block 312 is false, block 318 will result in exiting the flowchart. While plugged into the charge station 138, the vehicle will be parked and a flow of air that is normal for a vehicle in motion will not occur. As a result of being parked, cooling of the engine by the flow of air will be reduced in comparison to the vehicle in motion. To improve a flow of air, a cooling fan in the vehicle may be operated and thus improve engine cooling. The operation of the cooling fan may include turning the fan at a speed greater than a normal fan speed. For example, a fan speed may be set to normally rotate at 500 revolutions per minute (RPM) at a given temperature range. However when in fast charge mode, the fan may be operated for the given temperature range at 750 RPM. Another example is that an engine fan may be set to normally turn on when the engine temperature reaches 200 degrees Fahrenheit (F.). In fast charge mode, the engine fan turn on may be reduced to a lower temperature such as 150 degrees F. or the engine fan may operate at the same time the engine operates.

Figure 4:
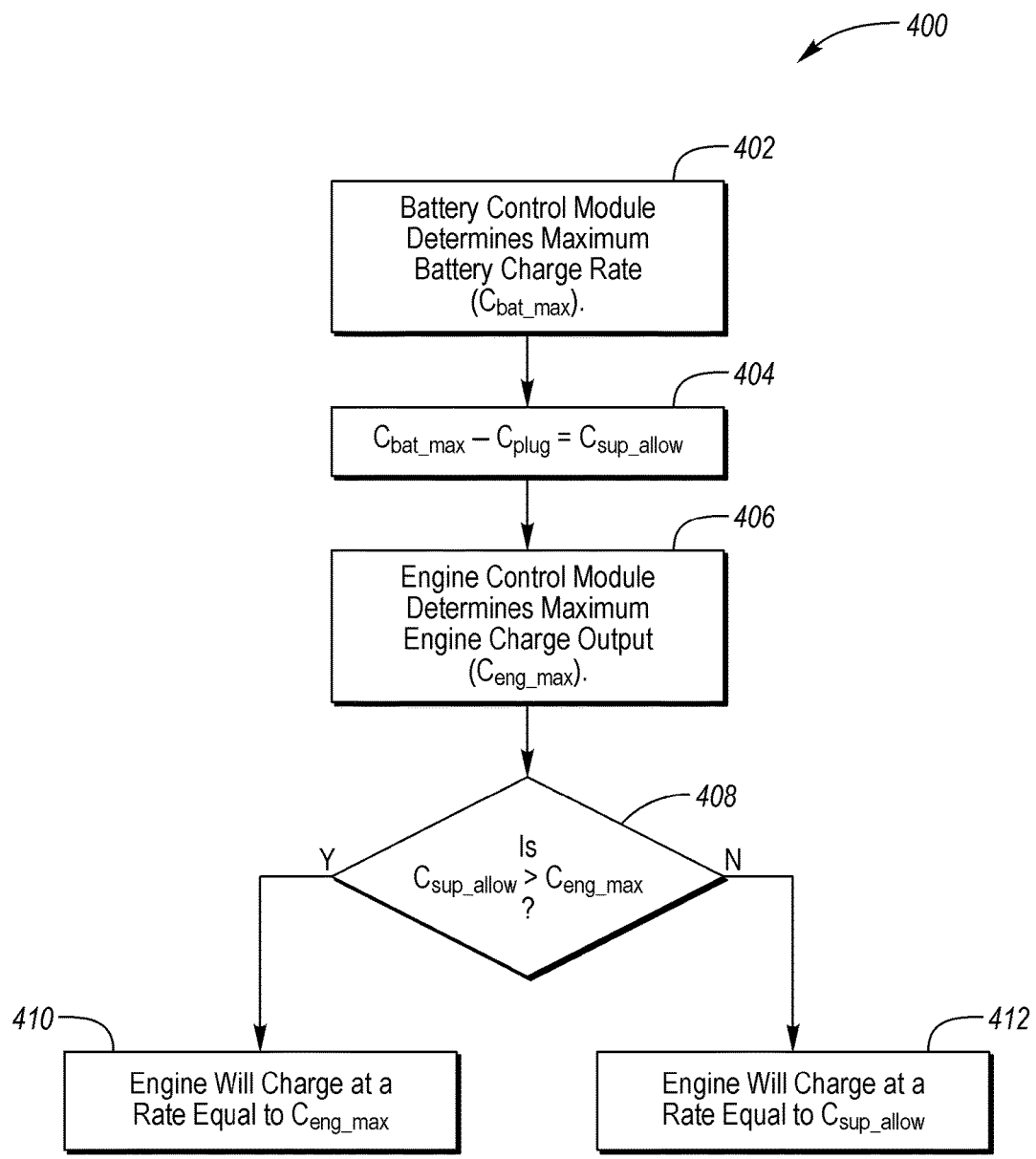
FIG. 4 is a flow diagram of charge rate determination for a fast charge mode of a plug-in hybrid vehicle.

FIG. 4 is a flow diagram of charge rate determination 400 for a fast charge mode of a plug-in hybrid electric vehicle. When a fast charge mode is enabled, battery conditions are used to determine a maximum battery charge rate ($C_{bat\_max}$). The battery conditions include battery SOC, battery temperature, battery system faults, and battery life. Based on the battery conditions, the battery control module determines the $C_{bat\_max}$ in block 402. A supplemental allowable charge ($C_{sup\_allow}$) is calculated from subtracting the charge supplied via the charge station ($C_{plug}$) from the maximum battery charge rate ($C_{bat\_max}$) in block 404. Based on conditions of the engine 218 including engine size, engine temperature, system faults, engine fuel, generator size and converter temperature, and current carrying capacity of the coupling between the generator and the battery, a maximum engine charge rate ($C_{eng\_max}$) is determined in block 406. In block 408, the controller decides if the supplemental allowable charge ($C_{sup\_allow}$) is larger than the maximum charge the engine can supply ($C_{eng\_max}$). If the maximum engine charge rate ($C_{eng\_max}$) is larger, the controller will branch to block 412 and the engine will operate to charge at a rate equal to the supplemental allowable charge ($C_{sup\_allow}$). Basically, block 408 finds the limiting factor and operates at or below that threshold. For example, if $C_{eng\_max}=10$ W and $C_{sup\_allow}=5$ kW, the amount the batteries can be charged is limited by $C_{sup\_allow}$, therefore the batteries will be charged 5 kW. If the supplemental allowable charge ($C_{sup\_allow}$) is larger, the controller will branch to block 410 and the engine will operate at ($C_{eng\_max}$) to charge the high voltage battery. Block 410 illustrates operation of the engine at $C_{eng\_max}$, however the engine may be operated at a lower charge rates based on fuel efficiency, temperature, and other factors.

Local communities may provide regulations or recommendations on the use of fossil fuels in a specific geographical area or "green zone". To meet a localized limit on fossil fuels, the use of the fast charge mode in an area outside of the green zone may be employed such that the vehicle may operate off the charged battery in the green zone and thus meet the communities' goals. For example, in some areas of London, electric vehicles and PHEVs which meet certain governmental criteria are exempted from the costly inner city commuter fee, also referred to as a congestion charge when operated on battery power. Some London boroughs offer free or reduced-charge parking for EVs. Although the term "Green Zone" is not used in London, they do have a "congestion charge" on vehicles that are not electric. The city does not prevent gas powered vehicles from driving there, but rather charges them for their pollution.

The vehicle may include a navigation system capable of providing route information. The vehicle may enable the fast charge mode based on data from the navigation system. For example, if the navigation system has data indicating a future route though a "green zone" at a future time, a controller may enable fast charge mode based on the route information, time and parameters associated with fast charge mode. The future time may include a future start time at which point it is expected that the vehicle begins the trip.

Another use of a fast charge mode is for a plug-in hybrid vehicle used as an emergency vehicle. For an emergency vehicle, it may be advantageous to maintain a battery at a high SOC level such that an operator of the emergency vehicle has the available power to use when responding to an emergency.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
an engine;
a traction battery; and
a controller configured to,
responsive to battery charge current from a battery charge station being less than a maximum charge current while the vehicle is parked and in fast charge mode, operate the engine to generate current to increase a charge rate of the battery, and responsive to a signal indicative of a future route expected to traverse a green zone, inhibit operation of the engine.

2. The vehicle of claim 1, wherein the controller is further configured to inhibit operation of the engine responsive to a signal indicative of a temperature of the engine exceeding a predetermined temperature.

3. The vehicle of claim 1, wherein the controller is further configured to activate a cooling fan for the engine when the engine is rotating.

4. The vehicle of claim 1, wherein the controller is further configured to, responsive to a temperature of the engine being greater than a predetermined temperature, activate a cooling fan at a speed greater than a standard speed.

5. The vehicle of claim 1, wherein the controller is further configured to inhibit operation of the engine responsive to a signal indicative of a level of carbon monoxide in an area proximate to the vehicle being greater than a predetermined concentration.

6. The vehicle of claim 1, wherein the controller is further configured to inhibit operation of the engine responsive to a signal indicative of a vehicle location being indoors.

7. The vehicle of claim 1, wherein the controller is further configured to inhibit operation of the engine responsive to a charge duration defined by a difference in an expected start time of the future route and a current time being less than a time to charge the battery with the charge current.

8. The vehicle of claim 1, wherein the battery charge station is an inductive charge station.

9. A powertrain control module for a hybrid vehicle comprising:
   a controller configured to,
      responsive to selection of a fast charge mode and flow of electric charge from a battery charge station to a traction battery, operate an engine to drive a generator to generate current to increase a rate of charge of the battery, and
      responsive to a signal indicative of a future route expected to traverse a green zone, inhibit operation of the engine.

10. The module of claim 9, wherein the controller is further configured to inhibit operation of the engine responsive to a signal indicative of a temperature of the engine exceeding a predetermined temperature.

11. The module of claim 9, wherein the controller is further configured to inhibit operation of the engine responsive to a signal indicative of a vehicle location being indoors.

12. The module of claim 9, wherein the controller is further configured to inhibit operation of the engine responsive to a charge duration defined by a difference in an expected start time of the future route and a current time being less than a time to charge the battery with the charge current.

13. The module of claim 9, wherein the battery charge station is an inductive charge station.

14. A method to supplement current from a battery charge station comprising:
   while a traction battery is receiving current from a charge station, operating an engine to drive a generator electrically coupled with a traction battery to generate a supplemental current to increase a charge rate of the battery; and
   inhibiting operation of the engine responsive to a signal indicative of a future route expected to traverse a green zone.

15. The method of claim 14 further including inhibiting operation of the engine responsive to a signal indicative of a temperature of the engine exceeding a predetermined temperature.

16. The method of claim 15, wherein the battery charge station is an inductive charge station.

17. The method of claim 14 further including inhibiting operation of the engine responsive to a charge duration defined by a difference in an expected start time and a current time being less than a time to charge the battery with the charge current.

\* \* \* \* \*